(12) United States Patent
Yoshida et al.

(10) Patent No.: US 10,435,513 B2
(45) Date of Patent: Oct. 8, 2019

(54) COMPOSITE OF SILICON OXIDE NANOPARTICLES AND SILSESQUIOXANE POLYMER, METHOD FOR PRODUCING SAME, AND COMPOSITE MATERIAL PRODUCED USING COMPOSITE THEREOF

(71) Applicant: AZ ELECTRONIC MATERIALS (LUXEMBOURG) S.A.R.L., Somerville, NJ (US)

(72) Inventors: Naofumi Yoshida, Shizuoka (JP); Yuji Tashiro, Shizuoka (JP); Daishi Yokoyama, Shizuoka (JP); Toshiaki Nonaka, Shizuoka (JP)

(73) Assignee: Ridgefield Acquisition, Luxembourg (LU)

( * ) Notice: Subject to any disclaimer, the term of this patent is extended or adjusted under 35 U.S.C. 154(b) by 0 days.

(21) Appl. No.: 14/652,672

(22) PCT Filed: Dec. 19, 2013

(86) PCT No.: PCT/JP2013/084019
§ 371 (c)(1),
(2) Date: Jun. 16, 2015

(87) PCT Pub. No.: WO2014/098169
PCT Pub. Date: Jun. 26, 2014

(65) Prior Publication Data
US 2016/0194451 A1    Jul. 7, 2016

(30) Foreign Application Priority Data
Dec. 21, 2012  (JP) .................. 2012-280136

(51) Int. Cl.
| | | |
|---|---|---|
| C08G 77/04 | (2006.01) | |
| C09D 183/04 | (2006.01) | |
| C08G 77/08 | (2006.01) | |
| C08K 3/36 | (2006.01) | |
| C08G 77/16 | (2006.01) | |

(52) U.S. Cl.
CPC .......... *C08G 77/04* (2013.01); *C08G 77/08* (2013.01); *C08K 3/36* (2013.01); *C09D 183/04* (2013.01); *C08G 77/045* (2013.01); *C08G 77/16* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 4,395,527 A * | 7/1983 | Berger | .................. C07F 7/0852 257/791 |
| 6,043,330 A | 3/2000 | Hacker et al. | |
| 2005/0069718 A1 | 3/2005 | Yoss-Kehl et al. | |
| 2006/0235178 A1* | 10/2006 | Wang | .................. C08G 77/045 528/21 |
| 2007/0185263 A1 | 8/2007 | Sakamoto et al. | |
| 2007/0196667 A1 | 8/2007 | Asai | |
| 2008/0167487 A1 | 7/2008 | Schaefer et al. | |
| 2009/0206453 A1 | 8/2009 | Fuji et al. | |
| 2010/0155871 A1 | 6/2010 | Hirano | |
| 2010/0160577 A1 | 6/2010 | Hirano | |
| 2011/0018108 A1 | 1/2011 | Kohmura et al. | |
| 2013/0040135 A1* | 2/2013 | Hirano | ..................... C08K 3/34 428/353 |
| 2015/0062896 A1 | 3/2015 | Doi et al. | |

FOREIGN PATENT DOCUMENTS

| | | |
|---|---|---|
| JP | 2000-510522 A | 8/2000 |
| JP | 2001-40215 A | 2/2001 |
| JP | 2005-99693 A | 4/2005 |
| JP | 2006-72367 A | 3/2006 |
| JP | 2007-507583 A | 3/2007 |
| JP | 2007-211061 A | 8/2007 |
| JP | 2008-540781 A | 11/2008 |
| JP | 2009-102628 A | 5/2009 |
| JP | 2010-90389 A | 4/2010 |
| JP | 2010-144136 A | 7/2010 |
| JP | 2010-150341 A | 7/2010 |
| JP | 2011-173738 A | 9/2011 |
| JP | 2013-234323 A | 11/2013 |
| WO | WO 2005/085913 A1 | 9/2005 |
| WO | WO 2006/088036 A1 | 8/2006 |
| WO | 2012/112553 A1 | 8/2012 |
| WO | WO 2013/179896 A1 | 12/2013 |

OTHER PUBLICATIONS

Machine Language English Abstract and Translation from JPO of JP2013-234323 A, which is equivalent to WO 2013/179896 A1 (Nov. 21, 2013).

* cited by examiner

*Primary Examiner* — Ronak C Patel
*Assistant Examiner* — Thomas A Mangohig
(74) *Attorney, Agent, or Firm* — Mitchell Brustein

(57) ABSTRACT

An object of the present invention is to provide a composite of silicon oxide nanoparticles and a silsesquioxane polymer, from which a cured film having a low refractive index can be formed inexpensively. Provided are a method of producing a composite of silicon oxide nanoparticles and a silsesquioxane polymer, the method comprising reacting a silsesquioxane polymer having a silanol group at a terminal or a silane monomer with silicon oxide nanoparticles having a hydroxyl group or an alkoxy group on the surface in a mixed solvent of an aqueous solvent and an organic solvent in the presence of a phase transfer catalyst, and a composite produced by the method.

10 Claims, No Drawings

COMPOSITE OF SILICON OXIDE NANOPARTICLES AND SILSESQUIOXANE POLYMER, METHOD FOR PRODUCING SAME, AND COMPOSITE MATERIAL PRODUCED USING COMPOSITE THEREOF

This application is a United States National Stage Patent Application under 35 U.S.C. § 371 of International Patent Application No. PCT/JP2013/084019, filed Dec. 19, 2013, which claims priority to Japanese Patent Application No. 2012-280136, filed Dec. 21, 2012, the contents of which are being hereby incorporated herein by reference.

BACKGROUND OF THE INVENTION

Technical Field

The present invention relates to: a composite of silicon oxide nanoparticles and a silsesquioxane polymer and a production method thereof, which are used in the production of a silicon oxide-containing composite cured film having an extremely low refractive index; and an interlayer insulation film, a semiconductor material, an anti-reflection film or an optical material using the same.

Background Art

In the fields of displays and optics, a problem that the visual effects are impaired by reflection of external light at the surface of a display or the like may occur. Thus, it is required that the reflection be reduced by laminating a film having a low or high refractive index on the surface of a display or the like. In order to satisfy such requirement, low-refractive index films having a refractive index close to that of the air have been developed. However, in many cases, the production of such a low-refractive index film requires a large-scale apparatus for chemical vapor deposition and the like, which is disadvantageous from the cost standpoint (for example, Patent Document 1). Therefore, it is desired to develop a material from which a film can be formed by a simple coating method.

Although materials capable of forming a film with a sufficiently low refractive index have been conventionally known, hardly any of them are industrially useful. For example, a fluorine compound-containing material is known (Patent Document 2). However, the cost of the raw material used for introducing a fluorine group into the material is high and, as far as the present inventors know, the effects thereof also have room for improvement. Further, there have been reports on methods of producing mesoporous silica that can be made into a low refractive material by a sol-gel method using an organic spacer decomposable at a low temperature (Patent Documents 3 to 6). Moreover, there are also known methods that use hollow silica particles (Patent Documents 7 and 8). In these methods, a low refractive index is realized by creating pores inside the formed film. However, in these methods that utilize porosity of the formed film, the former methods cannot attain a sufficient reduction in the refractive index without using a large amount of an organic spacer; therefore, it is required that the formation of pores be promoted more efficiently. Meanwhile, the latter methods have room for improvement in that, for example, the particles may undergo secondary aggregation and the surface of the particles must be processed so as to make the particles organic-soluble. From these standpoints, it is desired that particles in an aqueous solvent be reacted as-is because this inhibits secondary aggregation and reduces the processing cost.

PRIOR ART DOCUMENTS

Patent Documents

[Patent Document 1] Japanese Laid-open Patent Application (Kokai) No. 2006-72367
[Patent Document 2] Japanese Laid-open Patent Application (Kokai) No. 2001-40215
[Patent Document 3] Japanese Laid-open Patent Application (Kokai) No. 2007-211061
[Patent Document 4] Japanese Laid-open Patent Application (Kokai) No. 2005-99693
[Patent Document 5] Japanese Laid-open Patent Application (Kokai) No. 2010-90389
[Patent Document 6] WO 2006/088036
[Patent Document 7] Japanese Laid-open Patent Application (Kokai) No. 2011-173738
[Patent Document 8] WO 2005/085913

SUMMARY OF THE INVENTION

Problems to be Solved by the Invention

In view of the above-described problems to be solved, there is a demand for a material that has a low processing cost and is capable of forming a film with a lower refractive index.

Means for Solving the Problems

The first composite of silicon oxide nanoparticles and a silsesquioxane polymer according to the present invention is characterized in that it is obtained by reacting a silsesquioxane polymer having a silanol group at a terminal or a silane monomer with silicon oxide nanoparticles having a hydroxyl group or an alkoxy group on the surface in a mixed solvent of an aqueous solvent and an organic solvent in the presence of a phase transfer catalyst.

The second composite of silicon oxide nanoparticles and a silsesquioxane polymer according to the present invention comprises a silsesquioxane polymer and silicon oxide nanoparticles and is characterized in that silicon atoms of the silsesquioxane polymer are bound with the surface of the silicon oxide nanoparticles via oxygen atoms.

The electron device according to the present invention is characterized by comprising the above-described silicon oxide-containing composite material as an interlayer film, a refractive index control film, an anti-reflection film or a protective film.

Further, the method of producing a composite of silicon oxide nanoparticles and a silsesquioxane polymer according to the present invention is characterized by comprising reacting a silsesquioxane polymer having a silanol group at a terminal with silicon oxide nanoparticles having a hydroxyl group or an alkoxy group on the surface in a mixed solvent of an aqueous solvent and an organic solvent in the presence of a phase transfer catalyst.

Effects of the Invention

According to the present invention, a composite from which a film having a low refractive index can be inexpensively formed is provided. Since the silicon oxide particles and the polymer are bound with each other, aggregation and the like of metal oxide do not occur during a curing process, so that a high-quality cured film in which the metal oxide is uniformly dispersed can be formed. Such a cured film can be used as an interlayer film, a refractive index control film, a protective film or the like and, particularly in the applications where an optical function is required, since the cured film has a lower refractive index than conventional films, those problems that are caused by reflection of light can be improved.

DETAILED DESCRIPTION OF THE INVENTION

Mode for Carrying Out the Invention

Mode for carrying out the present invention will now be described in detail.

According to one embodiment of the present invention, a composite of silicon oxide nanoparticles and a silsesquioxane polymer (hereinafter, may be simply referred to as "composite") is produced by a specific production method. Concretely, this production method comprises reacting a silsesquioxane polymer having a silanol group at a terminal or a silane monomer with silicon oxide nanoparticles having a hydroxyl group or an alkoxy group on the surface in a mixed solvent of an aqueous solvent and an organic solvent in the presence of a phase transfer catalyst. This method may be hereinafter referred to as "reverse micelle dispersion method".

One characteristic feature of a silsesquioxane polymer that can be used in the present invention is that it has a silanol group at a terminal. The silsesquioxane polymer is a polymer containing a repeating unit typically represented by $[R^1SiO_{1.5}]$, and each silicon atom is bound with, on average, 1.5 oxygen atoms and one hydrocarbon group $R^1$. The oxygen atom at a polymer terminal is bound with hydrogen to form a silanol group, or with a hydrocarbon group. Further, the silsesquioxane polymer may also contain $[SiO_2]$ as a repeating unit. In the present invention, the term "silsesquioxane polymer" also encompasses polymers having a unit $[SiO_2]$ (siloxane bond) or the like. Here, the silicon atoms are all tetravalent, and 3 or 4 oxygen atoms are bound to each silicon atom. Each oxygen atom is bound with other silicon atom, hydrogen atom or hydrocarbon group via another bonding arm. Accordingly, since each oxygen atom is assigned to two atoms to which the oxygen atom is bound, even though 3 or 4 oxygen atoms are bound to the four bonding arms of each silicon atom, the number of oxygen atoms assigned to one repeating unit containing one silicon atom is a half thereof, which is 1.5 or 2.

That is, a silsesquioxane polymer preferably used in the present invention comprises a repeating unit selected from the group consisting of $[R^1SiO_{1.5}]$ (wherein R1 is a group selected from the group consisting of hydrogen, an alkyl group, an aryl group and an alkenyl group) and $[SiO_2]$. Here, the silsesquioxane polymer may contain a combination of two or more repeating units $[R^1SiO_{1.5}]$ in which $R^1$ is different. Further, within a range where the effects of the present invention are not adversely affected, the silsesquioxane polymer may also contain other repeating unit, particularly a silicon-containing repeating unit.

The main-chain portion of the silsesquioxane polymer is constituted by the above-described repeating unit(s), and the composition ratio of the repeating unit $[R^1SiO_{1.5}]$ and the repeating unit $[SiO_2]$ is preferably 100:0 to 40:60, more preferably 90:10 to 60:40.

Such a silsesquioxane polymer can be produced by an arbitrary method. For example, it can be produced by using a trifunctional organosilicon monomer and a tetrafunctional silicon monomer as starting materials and subjecting these monomers to a co-hydrolysis reaction.

More specifically, a silsesquioxane polymer having a silanol group at a terminal can be obtained by using $R^1Si(OR^2)_3$ and $Si(OR^2)_4$ as starting monomers and subjecting them to a co-hydrolysis reaction in the presence of an alkaline catalyst. Here, $R^1$ is a group selected from the group consisting of hydrogen, an alkyl group, an aryl group and an alkenyl group, and $R^2$ represents hydrogen or an alkyl group. In cases where a group other than hydrogen is selected, the group preferably has 1 to 10 carbon atoms. Two or more monomers in which $R^1$ and $R^2$ are different can also be used in combination. In this case, by adjusting the blending ratio of $R^1Si(OR^2)_3$ and $Si(OR^2)_4$, the composition ratio of the repeating units $[R^1SiO_{1.5}]$ and $[SiO_2]$ that are contained in the resulting silsesquioxane polymer can be adjusted.

As the repeating unit $[R^1SiO_{1.5}]$, those in which $R^1$ is different, for example, $R^1$ is a phenyl group, a methyl group or an ethyl group, can be used in combination. Further, the silsesquioxane polymer may also contain a repeating unit other than $[R^1SiO_{1.5}]$ and $[SiO_2]$. Particularly, a silsesquioxane polymer comprising a phenylene structure-containing repeating unit is preferably used because the crack resistance of a cured film formed therefrom is improved. Specifically, a silsesquioxane polymer having a main-chain portion represented by the following Formula (1) can be used.

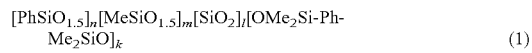

$$[PhSiO_{1.5}]_n[MeSiO_{1.5}]_m[SiO_2]_l[OMe_2Si\text{-}Ph\text{-}Me_2SiO]_k \quad (1)$$

Wherein Ph represents a phenyl group; Me represents a methyl group; n, m, l and k are each a number indicating the composition ratio of each repeating unit; generally, n+m is 40 to 100% by mol,
l is 0 to 40% by mol, and
k is 0 to 40% by mol;
and preferably,
n+m is 70 to 90% by mol,
l is 5 to 15% by mol, and
k is 0 to 20% by mol.
It is preferred that n be 40 to 60% by mol and m be 30 to 50% by mol.

As a reaction solvent, an ether, an ester or a ketone is generally used and, specifically, propylene glycol monomethyl ether acetate (hereinafter, may be referred to as "PGMEA"), propylene glycol monomethyl ether (hereinafter, may be referred to as "PGME") or propyl acetate is preferably used.

As a basic catalyst, for example, sodium hydroxide, potassium hydroxide, or a nitrogen-containing aromatic compound such as ammonia, a quaternary ammonium salt or pyridine is used. Further, as a solvent of these catalysts, pure water can be used. In this case, pure water can also function as a catalyst for promoting the reaction.

The reaction temperature is not particularly restricted. However, in order to allow the reaction to proceed in a moderate condition, it is preferred that the reaction be performed at about room temperature. If it is necessary to control the temperature, the temperature is controlled generally at 0 to 50° C., preferably at 20 to 30° C.

By such a reaction, a silsesquioxane polymer having a hydroxyl group at a terminal is obtained. The molecular weight of the resulting silsesquioxane polymer varies depending on the types of the starting materials as well as the reaction conditions. However, the silsesquioxane used in the present invention has a weight-average molecular weight of generally 500 to 20,000, preferably 700 to 5,000, and a number-average molecular weight of generally 300 to 5,000, preferably 500 to 2,000, in terms of polystyrene. A higher molecular weight is more advantageous from the standpoints of the residual film ratio and the like, while a lower molecular weight is more advantageous from the standpoints of the reactivity with silicon oxide particles and the stability of the polymer.

As required, thus produced silsesquioxane can be purified by washing, recrystallization or the like.

Further, in the present invention, a silane monomer can be used in place of a silsesquioxane polymer. Alternatively, a silsesquioxane polymer can be used in combination with a silane polymer. Preferred examples of such silane monomer include $R^1Si(OR^2)_3$ and $SI(OR^2)_4$, which are mentioned above as starting monomers used in the production of a silsesquioxane polymer.

In the present invention, as the above-described silicon oxide, one having a hydroxyl group or an alkoxy group on the particle surface is used. Such silicon oxide nanoparticles can be represented by the following Formula:

(wherein
R is hydrogen or a C1 to C10, preferably C1 to C6 alkyl group or alkenyl group and
2y+z=2x).

Here, two or more substituent Rs may exist in combination.

The particle size of the silicon oxide nanoparticles is arbitrarily selected in accordance of the purpose thereof. For example, in an application where optical transparency is demanded, a particle size that does not impair the transparency is selected according to the wavelength of light. Further, in an application such as an insulation film, it is preferred to select silicon oxide nanoparticles having a relatively large particle size. Still, the average particle size of the silicon oxide nanoparticles used in the present invention is preferably 5 to 200 nm, more preferably 20 to 100 nm. The average particle size of the silicon oxide nanoparticles can be determined by dynamic light scattering measurement.

Such an oxide can be produced by a common sol-gel method. Meanwhile, an oxide produced by curing contains hardly any hydroxyl group or the like. Therefore, it is preferred to use silicon oxide nanoparticles produced by a sol-gel method. Specifically, by adjusting a sol using $Si(OR)_4$ as a starting material, the silicon oxide nanoparticles represented by the Formula (2) can be prepared.

The silsesquioxane polymer according to the present invention is produced by partial chemical bonding between the above-described silsesquioxane polymer having a silanol group at a terminal and the above-described silicon oxide nanoparticles. One characteristic feature of the present invention is the use of a phase transfer catalyst as a catalyst of this reaction.

That is, silsesquioxane is usually used in a state of being dissolved in an organic solvent. Meanwhile, when silicon oxide nanoparticles are added to a silsesquioxane polymer solution, generally, the nanoparticles are not added in a powder form, but in the form of a dispersion in which the particles are dispersed in an aqueous medium. The reason for this is because silicon oxide is hydrophilic as described above and it is thus difficult to disperse silicon oxide in an organic solvent, and solid-form particles such as powder are not uniformly dispersed.

Accordingly, reaction between a silsesquioxane-containing organic phase and a silicon oxide-containing aqueous phase is not likely to proceed sufficiently. Therefore, in the present invention, a phase transfer catalyst is used to facilitate the reaction between these phases. In the present invention, such a method is referred to as "reverse micelle dispersion method".

The reverse micelle dispersion method will now be described more concretely.

First, a polymer solution is prepared by dissolving a silsesquioxane polymer having a silanol group at a terminal in an organic solvent. Here, as the organic solvent, PGMEA, n-propyl acetate (hereinafter, may be referred to as "nPA"), PGME and the like can be used. Thereamong, nPA is preferably used from the standpoint of its separability from an aqueous solvent, and PGME is preferably used from the standpoint of the stability of the final product, which is a composite. Alternatively, instead of a polymer solution, silane monomers corresponding to the starting materials of the silsesquioxane polymer can be used as well. As the silane monomers, $R^1Si(OR^2)_3$ and $Si(OR^2)_4$ (wherein $R^1$ and $R^2$ are selected from the group consisting of hydrogen, an alkyl group, an aryl group and an alkenyl group) can be used.

On another front, a dispersion of silicon oxide nanoparticles is prepared. Such a dispersion can be prepared by producing silicon oxide by a sol-gel method and dispersing the silicon oxide in water. However, a commercially available suspension can also be used as is. For example, a silicon dioxide dispersion (average particle size: 10 to 100 nm) commercially available from AZ Electronic Materials (Japan) K.K. under the trademark Klebosol or an aqueous dispersion of silicon dioxide (average particle size: about 30 nm) commercially available from CIK NanoTek Corporation under the trademark NanoTek can be used.

Next, a prescribed amount of a phase transfer catalyst is added to the aqueous dispersion of silicon oxide nanoparticles, and the silsesquioxane polymer solution is subsequently introduced thereto to perform reaction. That is, the reaction is performed in a mixed solvent of an aqueous solvent and an organic solvent.

As the phase transfer catalyst, quaternary ammonium compounds, quaternary phosphonium compounds, pyridinium compounds and crown ethers can be used, and it is preferred to use a quaternary ammonium compound or a quaternary phosphonium compound. A quaternary ammonium compound or a quaternary phosphonium compound interacts with the hydroxyl group existing on the surface of the silicon oxide nanoparticles and improves the affinity of the silicon oxide nanoparticles to an organic solvent, thereby functioning to facilitate phase transfer to an organic phase. Pyridinium compounds also have the same function. Further, crown ethers exhibit the same function by partially clathrating the polymer molecule. Among these compounds, specifically, a tetrabutylammonium salt, a trioctylmethylammonium salt or a benzyldimethyloctadecylammonium salt is preferably used. The phase transfer catalyst is used in an amount of preferably 10 to 100% by mol, more preferably 20 to 50% by mol, with respect to the number of moles of the silicon oxide nanoparticles.

The blending ratio of the silsesquioxane polymer or silane monomers and the silicon oxide nanoparticles is adjusted in accordance with the purpose, and it is generally 95:5 to 5:95, preferably 30:70 to 80:20, based on the weight.

The reaction temperature is preferably −20 to 120° C., more preferably −5 to 80° C. The reaction time is not particularly restricted, and the reaction sufficiently proceeds as long as the reaction time is not shorter than 1 hour.

In a composite obtained in this manner, the silanol group existing in the polymer matrix and the silicon oxide nanoparticles are chemically-bonded. This chemical bond is formed by, a condensation reaction between the silanol group contained in the silsesqulloxane polymer and the hydroxyl group or alkoxy group on the surface of the silicon oxide nanoparticles. That is, the composite has a structure wherein the silicon atoms of the silsesquioxane polymer and the surface of the silicon oxide nanoparticles are bound via oxygen atoms.

Since the composite according to the present invention has such a structure, the silicon oxide nanoparticles neither precipitate nor aggregate. Therefore, in a cured product obtained by using this composite, silicon oxide is uniformly dispersed, and this allows excellent properties to be exhibited.

The composite according to the present invention obtained in this manner is coated on a substrate or the like and subsequently heated to form a cured film. For the formation of such a cured film, a conventionally known arbitrary method can be employed.

Specifically, a cured film is formed by coating a composition containing the above-described composite on the surface of a base material, such as a silicon substrate, a glass substrate, a resin film, a wired substrate or a light-extraction part of a display device such as FPD, so as to form a coating film and subsequently curing the thus formed coating film.

The composition containing the composite is prepared by dissolving the composite in a solvent. This solvent is selected from those which are capable of dissolving the composite.

Examples of such a solvent include ethylene glycol monoalkyl ethers such as ethylene glycol monomethyl ether, ethylene glycol monoethyl ether, ethylene glycol monopropyl ether and ethylene glycol monobutyl ether; diethylene glycol dialkyl ethers such as diethylene glycol dimethyl ether, diethylene glycol diethyl ether, diethylene glycol dipropyl ether and diethylene glycol dibutyl ether; ethylene glycol alkyl ether acetates such as methyl cellosolve acetate and ethyl cellosolve acetate; propylene glycol alkyl ether acetates such as PGMEA, propylene glycol monoethyl ether acetate and propylene glycol monopropyl ether acetate; aromatic hydrocarbons such as benzene, toluene and xylene; and ketones such as methyl ethyl ketone, acetone, methyl amyl ketone, methyl isobutyl ketone and cyclohexanone. These solvents may each be used individually, or two or more thereof may be used in combination. The blending ratio of the solvent(s) is usually not less than 50% by weight, preferably not less than 60% by weight, and usually 90% by weight or less, preferably 85% by weight or less, based on the total weight of the composition containing the composite.

Further, as required, the composition according to the present invention may also contain other component(s). Examples thereof include surfactants, lubricants and viscosity modifiers.

Thereamong, it is preferred to use a surfactant so as to improve the coating property. Examples of a surfactant that can be used in the composition of the present invention include non-ionic surfactants, anionic surfactants and amphoteric surfactants.

Examples of the non-ionic surfactants include polyoxyethylene alkyl ethers such as polyoxyethylene lauryl ether, polyoxyethylene oleyl ether and polyoxyethylene cetyl ether; polyoxyethylene fatty acid diesters; polyoxy fatty acid monoesters; polyoxyethylene-polyoxypropylene block polymers; acetylene alcohols; acetylene glycols; polyethoxylates of acetylene alcohols; acetylene glycol derivatives such as polyethoxylates of acetylene glycols; fluorine-containing surfactants, such as Fluorad (trade name, manufactured by Sumitomo 3M Ltd.), MEGAFACE (trade name, manufactured by DIC Corporation) and Surufuron (trade name, manufactured by Asahi Glass Co., Ltd.); and organosiloxane surfactants such as KP341 (trade name, manufactured by Shin-Etsu Chemical Co., Ltd.). Examples of the above-described acetylene glycols include 3-methyl-1-butyne-3-ol, 3-methyl-1-pentyne-3-ol, 3,6-dimethyl-4-octyne-3,6-diol, 2,4,7,9-tetramethyl-5-decyne-4,7-diol, 3,5-dimethyl-1-hexyne-3-ol, 2,5-dimethyl-3-hexyne-2,5-diol and 2,5-dimethyl-2,5-hexanediol.

Examples of the anionic surfactants include ammonium salts and organic amine salts of alkyldiphenyl ether disulfonic acids; ammonium salts and organic amine salts of alkyldiphenyl ether sulfonic acids; ammonium salts and organic amine salts of alkylbenzenesulfonic acids; ammonium salts and organic amine salts of polyoxyethylene alkyl ether sulfuric acids; and ammonium salts and organic amine salts of alkyl sulfuric acids.

Examples of the amphoteric surfactants include 2-alkyl-N-carboxymethyl-N-hydroxyethyl imidazolium betaine and lauric acid amide propylhydroxysulfone betaine.

These surfactants may be used individually, or two or more thereof may be used in combination, and the blending ratio thereof is usually 50 to 5,000 ppm, preferably 100 to 2,000 ppm, with respect to the total weight of the composition.

A coating film of the composition of the present invention can be formed by a common coating method, that is, an arbitrary method conventionally known as a coating method of a photosensitive composition, such as dip coating, roll coating, bar coating, brush coating, spray coating, doctor coating, flow coating, spin coating or slit coating. When the base material is a film, a coating film can also be formed by gravure coating. If desired, a drying step in which the solvent is removed from the coating film can also be incorporated separately. As required, the composition can be coated once, twice or more times to form a coating film of a desired thickness.

After the formation of a coating film, in order to dry the coating film and reduce the amount of residual solvent, it is preferred that the coating film be subjected to prebaking (heat treatment). The prebaking step is performed at a temperature of generally 70 to 150° C., preferably 90 to 150° C., for a period of 10 to 180 seconds, preferably 30 to 90 seconds when a hot plate is used, or 1 to 30 minutes when a clean oven is used.

The curing temperature for curing the coating film can be arbitrarily selected as long as it is a temperature at which the coating film is cured. However, when the curing temperature is excessively low, the reaction may not proceed sufficiently and the coating film may thus not be cured sufficiently. Therefore, the curing temperature is preferably 150° C. or higher. Meanwhile, when the curing temperature is excessively high, for example, the production cost is increased and the polymer may be decomposed; therefore, the curing temperature is preferably 400° C. or lower. The curing time is not particularly restricted. However, it is generally 5 minutes or longer, preferably 10 minutes or longer.

Further, the curing is performed in an inert gas or in the air.

A silicon oxide-containing composite material produced in this manner contains both a silicon oxide originating from the silicon oxide nanoparticles and a silicon oxide formed by curing of the silsesquioxane polymer. The phase transfer catalyst used in the synthesis of the composite acts as a catalyst in the reaction and remains thereafter being adsorbed or bound to the silicon oxide particles and silsesquioxane polymer. It is speculated that, during the curing, the phase transfer catalyst surrounding the silicon oxide nanoparticles is decomposed or evaporated from the coating film and voids are thereby formed around the silicon oxide nanoparticles. It is also speculated that the resulting cured article consequently has a structure wherein silicon oxide nanoparticles are encapsulated in the voids. Thus, the cured article achieves a refractive index lower than those of cured articles that are normally obtained.

In this manner, the phase transfer catalyst in the present invention not only functions as a natural catalyst, but also functions as a spacer for forming pores.

Therefore, in the present invention, a phase transfer catalyst is indispensable also as a spacer. However, in order to supplement its function, an organic spacer compound having no catalytic action can also be added to the composition. The term "organic spacer compound" used herein refers to a compound capable of adsorbing and binding to the silicon oxide nanoparticles and silsesquioxane polymer, which compound can be decomposed or evaporated during curing to form pores.

It is preferred that such an organic spacer compound has a long-chain alkyl group. Further, it is also preferred that the long-chain alkyl group be substituted with a hydroxy group, an amino group, a nitroso group, a carboxyl group or the like. Specific examples of such an organic spacer compound include polyoxyethylene stearyl ether and polyoxyethylene polyoxypropylene alkyl ether. When used, the amount of such an organic spacer compound to be contained is preferably 1 to 100% by mol, more preferably 2 to 20% by mol, with respect to the total amount of the composite. From the standpoint of reducing the refractive index, a larger amount is more preferred. However, from the standpoint of the post-curing residual film ratio as well as the cost standpoint, it is preferred to reduce the amount of use.

Such an organic spacer compound can be used in the production of a silsesquioxane compound having a silanol group. In particular, it is more preferably used in the synthesis of a composite containing silicon oxide nanoparticles.

A cured film produced by the above-described method, which is a silicon oxide-containing composite material, has excellent physical properties. Specifically, the cured film of the present invention has excellent refractive index, transmittance, strength, dielectric constant and the like depending on the type of the incorporated silicon oxide, and these properties are uniform throughout the cured film. Therefore, the cured film of the present invention is capable of exhibiting properties that are not found in conventional silicon materials and can thus be used as an interlayer film, a refractive index control film, a protective film or the like in, for example, optical applications such as electron devices, optical devices, LEDs and OLEDs.

The present invention will now be described concretely by way of examples thereof.

Synthesis Example 1 (Synthesis of Silsesquioxane Polymer A)

To a four-necked flask, 178 g of methyltriethoxysilane (MeSi(OC$_2$H$_5$)$_3$) and 360 g of PGMEA were loaded, and these materials were dissolved. Next, 8.33 g of 48% aqueous sodium hydroxide solution was added thereto, and the resultant was stirred at 500 rpm for 2 hours. Then, 120 g of acetic acid and 120 g of pure water were further added, and the resultant was stirred for 1 hour.

Thereafter, the resulting reaction solution was transferred to a separatory funnel and left to stand for 30 minutes, thereby separating an organic solvent phase and an aqueous phase.

The aqueous phase was discarded, and 120 g of pure water was newly added to the organic solvent phase in the separatory funnel, followed by shaking. The alkaline component and water-soluble component remaining in the organic solvent phase were extracted and washed. This washing operation was performed three times. Thereafter, the organic solvent phase washed with pure water was recovered.

As a result of measuring the molecular weight of silsesquioxane polymer A contained in the organic solvent phase, the number-average molecular weight (Mn) and weight-average molecular weight (Mw) were found to be 3,000 and 7,500, respectively, in terms of polystyrene. This polymer was adjusted with a PGMEA solution to a concentration of 20 wt % to obtain a silsesquioxane polymer A solution.

Synthesis Example 2 (Synthesis of Silsesquioxane Polymer B)

To a three-necked flask, 6.23 g of methyltriethoxysilane and 10 g of PGME were loaded and, after adding thereto 0.4 g of a phase transfer catalyst and the resultant was stirred for 1 hour. After the reaction, the resulting liquid was transferred to a separatory funnel and left to stand for 30 minutes. The liquid was separated into two layers in a transparent state. From this, it was judged that aggregation or the like of the SiO2 nanoparticles did not occur.

Then, 40 g each of water and PGME and 80 g of nPA were further added to wash an organic solvent layer. The organic solvent layer was recovered and subsequently concentrated using an evaporator to adjust the concentration to be about 20 wt %.

Example 2 (Formation of Composite with Silicon Oxide Nanoparticles)

A composite was synthesized in the same manner as in Example 1, except that the amount of the SiO2 nanoparticles was changed to 15 g and that of methyltriethoxysilane was changed to 4.96 g.
Since the organic solvent layer was transparent, it was found that uniform dispersion (reaction) occurred.

Example 3 (Formation of Composite with Silicon Oxide Nanoparticles)

A composite was synthesized in the same manner as in Example 1, except that the amount of the SiO$_2$ nanoparticles was changed to 21 g and that of methyltriethoxysilane was changed to 9.35 g.
Since the organic solvent layer was transparent, it was found that uniform dispersion (reaction) occurred.

Example 4 (Formation of Composite with Silicon Oxide Nanoparticles)

To a three-necked flask, 18 g of a 10 wt % solution in which SiO$_2$ nanoparticles having an average particle size of 20 nm (Klebosol 1717 (trade name), available from AZ Electronic Materials (Japan) K.K.) were dispersed in water and 24 g of the silsesquioxane polymer A that was synthesized and adjusted in Synthesis Example 1 were loaded. After adding thereto 2 g of a phase transfer catalyst (trioctylmethylammonium chloride), 30 g of PGMEA and 5 g of water were further added, and the resultant was stirred for 1 hour. After the reaction, the resulting liquid was transferred to a separatory funnel and left to stand for 30 minutes. The liquid was separated into two layers in a transparent state. From this, it is estimated that aggregation or the like of the $SiO_2$ nanoparticles did not occur.

After discarding an aqueous layer, 80 g of water was further added to wash an organic solvent layer.

The organic solvent layer was recovered and subsequently concentrated using an evaporator to adjust the concentration to be about 20 wt %.

Example 5 (Formation of Composite with Silicon Oxide Nanoparticles)

A composite was synthesized in the same manner as in Example 1, except that the amount of the phase transfer catalyst, trioctylmethylammonium, was changed to 20% by mol with respect to the amount of Si.

Since the organic solvent layer was transparent, it was found that uniform dispersion (reaction) occurred.

Curing of Film and Measurement of Refractive Index le;.5qThe compositions containing each of the composites of Examples 1 to 5 were each spin-coated on a substrate, the solvent was evaporated by heating at 130° C. for 90 seconds, and the resultant was cured at curing temperature of 250° C. for 1 hour, thereby forming a cured film. Further, for comparison, cured films were formed in the same manner using the polymers of Synthesis Examples 1 to 3.

The refractive indices of the films that were cured at the prescribed temperature were measured by ellipsometry. The results thereof are shown in Table 1. As a result, it (trioctylmethylammonium chloride) and 10 g each of PGME and water, the resultant was stirred at 100° C. for 1 hour. After the reaction, the resulting liquid was transferred to a separatory funnel and left to stand for 30 minutes. The liquid was separated into two layers in a transparent state. Then, 40 g of water and 80 g of nPA were further added to wash an organic solvent layer.

The organic solvent layer was recovered and subsequently concentrated using an evaporator to adjust the concentration to be about 20 wt %.

As a result of measuring the molecular weight of the thus obtained polymer, Mn and Mw were found to be 500 and 4,700, respectively.

Synthesis Example 3 (Preparation of Silsesquioxane Polymer C)

To the silsesquioxane A synthesized in Synthesis Example 1, 2% by mol of a phase transfer catalyst, trioctylmethylammonium hydroxide, was added and the resultant was stirred for 3 minutes.

Synthesis Example 4 (Synthesis of Silsesquioxane Polymer D)

A polymer was obtained in the same manner as in Synthesis Example 2, except that the amount of the phase transfer catalyst was changed to 4 g.

Example 1 (Formation of Composite with Silicon Oxide Nanoparticles)

To a three-necked flask, 9 g of a 10 wt % solution in which $SiO_2$ nanoparticles having an average particle size of 20 nm (Klebosol 1717 (trade name), available from AZ Electronic Materials (Japan) K.K.) were dispersed in water was loaded, and 10 g of PGME and 10 g of water were added thereto. Then, 6.23 g of methyltriethoxysilane and 10 g of PGME were further added. Next, 0.4 g (0.001 mol) of a phase transfer catalyst (trioctylmethylammonium chloride) was added, was confirmed that the films formed from the composites of Examples 1 to 5 had a lower refractive index than the films formed from the original polymers.

TABLE 1

| | Methyltriethoxysilane/ Silicon oxide particle blending ratio | Phase transfer catalyst (mol %) | Refractive index (633 nm) | Transmittance (400 nm) |
|---|---|---|---|---|
| Example 1 | 70/30 | 2 | 1.276 | >95% |
| Example 2 | 50/50 | 2 | 1.231 | >95% |
| Example 3 | 30/70 | 2 | 1.219 | >95% |
| Example 4 | 70(Silsesquioxane A)/30 | 5 | 1.280 | >95% |
| Example 5 | 70/30 | 20 | 1.100 | >95% |
| Comparative Example 1 | Silsesquioxane A | 0 | 1.383 | >95% |
| Comparative Example 2 | Silsesquioxane B | 2 | 1.347 | >95% |
| Comparative Example 3 | Silsesquioxane C | 2 | 1.374 | >95% |

The composites of Examples all had a low refractive index and, particularly in Examples 1 to 4, it was confirmed that even a relatively small amount of the phase transfer catalyst reduced the refractive index. In addition, from Examples 1 to 3 and Comparative Example 2, it was confirmed that the refractive index was reduced by increasing the amount of the $SiO_2$ nanoparticles. The composite of Example 5 in which the phase transfer catalyst was added in an amount of 20% by mol showed a considerably low refractive index of 1.1, and it was thus found that the refractive index can be reduced by increasing the amount of the phase transfer catalyst.

From Comparative Examples 1 to 3, it was suggested that the effect exerted by the phase transfer catalyst is not attributed to the inclusion of the very phase transfer catalyst in the cured films, but to the use of the phase transfer catalyst in the process of synthesizing the composites where the phase transfer catalyst functions as a spacer for forming spaces between the silicon nanoparticles and the cured polymer and the refractive index is consequently reduced.

Examples 6 to 9 (Measurement of Changes in Physical Properties Depending on Curing Temperature)

For cured films obtained by using different curing temperatures in the process of coating and curing the composite of Example 1, the physical properties were evaluated. The results thereof are shown in Table 2.

TABLE 2

| | Curing temperature (° C.) | Refractive index (633 nm) | Transmittance (400 nm) |
|---|---|---|---|
| Example 6 | 130 | 1.453 | >95% |
| Example 7 | 150 | 1.394 | >95% |
| Example 8 | 200 | 1.278 | >95% |
| Example 9 | 250 | 1.276 | >95% |
| Example 10 | 300 | 1.271 | >95% |
| Example 11 | 350 | 1.271 | >95% |

The cured film samples all had a transmittance of 95% or higher and the particles were uniformly dispersed therein.

In Comparative Example 4, curing was carried out using the silsesquioxane D in the same manner as in Example 5. For these two examples, the residual film ratio and the refractive index were measured before and after curing at 250° C.

TABLE 3

|  | Methyltriethoxysilane/ Silicon oxide particle blending ratio | Phase transfer catalyst (mol %) | Refractive index (633 nm) | Residual film ratio |
|---|---|---|---|---|
| Example 5 | 70/30 | 20 | 1.100 | >95% |
| Comparative Example 4 | Silsesquioxane D | 20 | 1.254 | >95% |

According to Table 3, a lower refractive index and a higher residual film ratio were attained in Example 5 despite the phase transfer catalyst was used in the same amount. This is thought to be because, when the composite according to the present invention is cured, the composite is more likely to take a structure in which pores are maintained.

The invention claimed is:

1. A composite consisting of silicon oxide nanoparticles, a silsesquioxane polymer, a phase transfer catalyst and one or more optional components selected from the group consisting of surfactants, organic spacers, lubricants and viscosity modifiers, wherein such that said composite has a transmittance of >95% at a wavelength of 400 nm, wherein the transmittance is obtained by curing the coating film at a temperature of 150° C. or higher for 5 min or longer, and wherein said composite is obtained by reacting said silsesquioxane polymer having a silanol group at a terminal with silicon oxide nanoparticles having a hydroxyl group or an alkoxy group on a surface of the silicon oxide nanoparticles in a mixed solvent of an aqueous solvent and an organic solvent in the presence of said phase transfer catalyst, said phase transfer catalyst is present in an amount of 2 to 50% by mol based on the total amount of said composite, and wherein said silsesquioxane polymer comprises a repeating unit selected from the group consisting of $[R^1SiO_{1.5}]$, wherein $R^1$ is selected from the group consisting of hydrogen, an alkyl group, an aryl group and an alkenyl group, and $[SiO_2]$.

2. The composite according to claim 1, wherein said silsesquioxane polymer has a weight-average molecular weight of 500 to 20,000.

3. The composite according to claim 1, wherein said silicon oxide nanoparticles have an average particle size of 5 to 200 nm.

4. The composite according to claim 1, wherein said aqueous solvent is water or a mixed solvent of water and an alcohol.

5. The composite according to claim 1, comprising said silicon oxide nanoparticles in an amount of 5 to 90% by weight based on the a total amount of said composite.

6. The composite according to claim 1, wherein silicon atoms of said silsesquioxane polymer are bound with the surface of said silicon oxide nanoparticles via oxygen atoms.

7. The composite according to claim 1, obtained by heat-curing the composite according to claim 1 in the air or in an inert atmosphere.

8. The silicon oxide-containing composite material according to claim 7, which is a porous material comprising pores formed therein.

9. An electron device, comprising the silicon oxide-containing composite material according to claim 7 as an interlayer film, a refractive index control film, an anti-reflection film or a protective film.

10. A method of producing the composite of claim 1 wherein said method comprises reacting said silsesquioxane polymer having a silanol group at a terminal with silicon oxide nanoparticles having a hydroxyl group or an alkoxy group on the surface of the silicon oxide nanoparticles in a mixed solvent of an aqueous solvent and an organic solvent in the presence of a phase transfer catalyst in an amount of 2 to 50% by mol based on the total amount of said composite.

* * * * *